United States Patent [19]

Correll

[11] Patent Number: 5,118,147
[45] Date of Patent: Jun. 2, 1992

[54] GRATING FASTENER

[75] Inventor: Jerome B. Correll, New Orleans, La.

[73] Assignee: Grating Specialty Co., Inc., New Orleans, La.

[21] Appl. No.: 699,171

[22] Filed: May 13, 1991

[51] Int. Cl.⁵ ............................................. F16B 2/12
[52] U.S. Cl. .................................. 292/256; 403/387; 52/507
[58] Field of Search ................. 52/507, 581; 403/387, 403/400, 24; 292/256

[56] References Cited

U.S. PATENT DOCUMENTS

| | | | |
|---|---|---|---|
| 1,822,909 | 9/1931 | Schneider | 52/507 |
| 2,467,877 | 4/1949 | Barry | 52/507 |
| 3,185,269 | 5/1965 | Nagin | 52/507 X |
| 3,456,412 | 7/1969 | Decombos | 403/400 X |
| 4,362,422 | 12/1982 | Zinkann et al. | 403/387 |

FOREIGN PATENT DOCUMENTS 630624  7/1963  Belgium .............................. 52/507

OTHER PUBLICATIONS

Unistrut Northeast, "Lindapter from UNISTRUT", 1988, 20 pages, p. 13 of Lindapter product catalog of particular interest.

*Primary Examiner*—Richard E. Moore
*Attorney, Agent, or Firm*—Pravel, Gambrell, Hewitt, Kimball & Krieger

[57] ABSTRACT

A grating fastener which can be used to connect grating to structural members, grating sheets to other grating sheets, or to mount a projection means above the grating for connection of other structural or mechanical devices. The grating fastener in one embodiment includes a jaw assembly which has teeth that provide extra strength and holding power for the grating fastener. The top cover or recess clip mounts on top of the grating and includes a square recess area which provides additional strength and durability. The grating fastener can be installed from above the grating by one person with no power tools required and without any holes required to be formed into the structure. The grating fastener is easily retrievable and thus can be reused as many times as desired.

17 Claims, 3 Drawing Sheets

GRATING FASTENER

BACKGROUND OF THE INVENTION

1. Field of the Invention

The present invention relates generally to fastener devices and methods, and more particularly in certain embodiments to fastener devices used to attach grating sheets to supporting structural members, or to attach structural members to grating sheets, or to attach grating sheets to adjacent grating sheets.

2. Description of the Related Art

Bar-type floor and deck grating is used as a floor in many industrial facilities. Bar-type grating is manufactured in rectangular sheets, typically two to four feet wide and 20 to 30 feet in length. Bar-type grating is normally constructed as open grids having parallel spaced load-supporting bearing bars running the length of the sheet of grating, interconnected by cross-bars running perpendicular thereto. The cross-bars are welded to each bearing bar that they pierce. The principal dimension by which grating is selected is the grating thickness, which determines its load-bearing strength. The grating thickness represents the dimension measured from the contact surface of the structural member on which the grating is installed to the top surface of the grating upon which people walk. While most grating is made in thicknesses of one inch, grating thicknesses may range from less than one inch up to any thickness, although thicknesses above two inches are not commonplace.

Bar-type floor and deck grating is typically made out of metal or fiberglass. The means for attaching the grating to the structural member is affected by the material out of which the grating is fabricated.

One prior art method used to attach sheets of metal grating to structural support members was simply to weld the bearing bar to the supporting structural member. A problem with welding is that each weld damages the paint system already in place on the structure. Welding also may weaken the structural steel, especially heat treated steel. Welding the metal grating is costly because it requires a well-trained person and expensive equipment. Furthermore, welding may not be possible without shutting down the facility due to safety reasons. Also, direct welding of the bearing bars to the structural support member does not permit the grating to be easily removed. The welding method was used in many power generating stations across the U.S. in the past, and many of these installations now suffer safety problems due to loose grating. This loosening was caused by corrosion in the atmosphere, continual expansion and contraction in normal ambient temperature fluctuations, and similar effects. Therefore, problems arise when welding is used to fasten grating to structural support members.

Another method of fastening grating is by the use of saddle clips, also called m-clips and butterfly clips. The saddle clip typically comprises sheet metal pressed to have two downwardly facing channels spaced apart to fit over two adjacent bearing bars of the grating and a connecting portion between these two channels. The connecting portion of the saddle clip includes a hole for receiving a stud bolt or other threaded fastener. The clip is placed over the upper edge of two adjacent bearing bars and an upstanding stud bolt which has been welded to the structural support member. A nut fastens the clip to the stud bolt and secures the grating. The welding of the stud bolt results in many of the same problems associated with welding the bearing bars to the structural support members as discussed above.

Alternatively, a hole may be drilled through the structural support member and a bolt and nut used to fasten the saddle clip to the structural support member. This technique is impractical due to the fact that it requires one person to work from above the grating and a second person to work from below the grating. Additionally, this technique often results in a need for extensive scaffolding being erected below the structural support member. The holes drilled in structural support members weaken the support member and encourage the formation of rust and corrosion unless touch-up painting is performed.

Another technique used to fasten the grating with a saddle clip is with a threaded tap and bolt combination which first drills a hole, then follows by cutting screw threads in the hole, and lastly follows with a threaded bolt portion which tightens in the threaded hole. Once again, each hole encourages the formation of corrosion, and the tap and bolt combination often fails to adequately perform due to breaking before the tapping is finished or stripping the threads in the final tightening process. The broken fasteners are usually left in place and an additional hole is drilled nearby which further weakens the structural member. This technique also requires the use of power tools.

In another technique, saddle clips may be attached to powder-cartridge driven studs which have been fired into the structural steel member by a stud gun powered by a 0.22 caliber blank cartridge. This method is often not allowable due to the stud gun's inherent danger as a weapon.

Referring now to FIG. 1, a mechanical type of grating fastener employing a saddle clip is shown and described in U.S. Pat. No. 4,362,422 to Zinkann et al. This fastener has an upper saddle clip which is connected to a lower assembly by a threaded bolt. The lower assembly includes a base member having an engagement portion which slants downwardly away from the grating bearing bars engaged by the upper saddle clip and which bears against the lower surface of a structural member flange or leg. The lower assembly also includes a swivel clamp which is spring biased to swivel, after passing through the bearing bars, into a position which will engage the underside of the same two bearing bars engaged by the saddle clip. This fastener can be installed by one person working from above without any welding or drilling. As the threaded bolt is tightened, one half of the force in the threaded bolt is transmitted through the engagement portion to the lower surface of the structural member flange and one half is transmitted through the swivel clamp to the grating bearing bars. Thus, only one half of the total force in the bolt is being utilized to secure the grating to the structural member. In addition, the downward slant of the engagement portion generally does not provide a surface for "gripping" the flange of the structural member. Furthermore, certain structural members as classified by the American Institute of Steel Construction (AISC), such as angles and W shapes, have a uniform flange or leg thickness instead of a tapered flange thickness, which is typical for channels and S-shapes. Thus, the slanted engagement portion of the Zinkann fastener does not provide uniform engagement of the flange irrespective of the type of structural member. Additionally, the swivel clamp which engages the underside of the bearing bars has a fixed height which controls the bearing contact of the engagement portion of the base member with the flange. Lastly, when removal of the fastener is attempted, the swivel clamp prevents the fastener from coming up through the grating bars, so the common way to remove the fastener is to remove the bolt and let it fall, creating a safety problem. Since the flange thickness varies from structural member to structural member, the bearing contact of the base member and thus the effectiveness and securing ability of the Zinkann fastener also varies from structural member to structural member.

In addition to the problems discussed above, saddle clips generally do not hold up well in the industrial settings where they are employed. In most of the industrial-type settings where grating is used, heavy objects are transported and routinely placed or dropped on the grating. As a result of heavy objects being placed or dropped on the grating, the M-shaped saddle clips tend to bulge outwardly due to their shape and lack of resistance to bending along the length of the saddle clip between the grating bearing bars. This problem is aggravated by the fact that, during the formation of a saddle clip, the flat piece of metal that is to become the saddle clip must be deformed precisely at the point where the portion of the saddle clip is exposed above the surface of the grating, thus weakening this portion of the metal. The effect of a saddle clip bulging outward is a loosening of the attachment of the saddle clip to the adjacent bearing bars, causing the attachment of the grating to the support member to become loose and ineffective.

Therefore, it would be desirable to have a simple, reliable, inexpensive and versatile mechanical fastener which can securely fasten grating to structural support members without the requirement of any welding or drilling and which can be installed by one person working from above. The fastener should provide a firm and secure attachment of grating to structural support members, regardless of the size and shape of the support member, for extended periods of time in all conditions.

SUMMARY OF THE INVENTION

The present invention in certain embodiments comprises a fastener for grating which securely fastens grating to a structural support member without any requirement of welding or drilling. The grating fastener may be installed by an unskilled person working from above the grating. In addition, the grating fastener according to the present invention is durable, reusable, is not loosened by heavy loads being dropped upon it, and provides a secure attachment for an extended period of time. The grating fastener of the present invention includes the features of superior strength, ease of installation, and holding power. In addition, the grating fastener is versatile and can be used to attach grating to structural support members, to fasten parallel sheets of grating to one another, or to securely mount a stud or bolt above the grating for mounting various devices to the grating surface.

In one embodiment, the present invention comprises a jaw assembly connected to a top cover or recess clip by a threaded fastener or bolt. The jaw assembly includes a pair of jaws, each having serrated teeth on the upper surface of the jaw for gripping the underside of a structural support member flange or leg. The serrated teeth provide extra gripping and holding power over extended periods of time, with only minimal damage to the joint coating, if any. The grating fastener attaches grating to a structural member by placing the serrated teeth of the jaw assembly against the lower surface of the flange of the structural member with the recess clip on the upper surface of adjacent grating bearing bars. As the bolt is tightened, the serrated teeth grip the lower surface of the flange end and the recess clip firmly bears against the grating bearing bars, thus fastening by compressing the grating to the structural member. Substantially all of the force in the bolt is transmitted to the jaws which bear against the flange of the structural member. The recess clip provides a surface area of undeformed flat metal to withstand heavy loads being dropped upon it. In addition, the recess clip includes a centrally located square recess which provides additional strength against bending between the adjacent bearing bars. The square recess includes small drainage holes to prevent water from collecting in the recess and thereby prevent corrosion.

In another embodiment of the invention, the top cover or recess clip and threaded fastener or bolt of the first embodiment are used with a J-shaped connecting member to connect grating to a vertical leg or flange, as for example. of an angle member. The J-shaped connecting member attaches to the recess clip by a threaded fastener and a lower end of the J-shaped connecting member hooks around the lower end of the vertical leg of the angle member. The grating fastener of the first embodiment may be used to firmly attach the grating to the horizontal leg of the angle member and the grating fastener of the second embodiment may be used to attach the grating to the vertical leg of the angle member. However, either the first or the second embodiment may be used independently of the other to attach grating to an angle member.

In another embodiment of the invention, the grating fastener of the first embodiment is used in combination with a base member, a recess clip, and a threaded fastener to fasten two parallel grating sheets to each other or to attach grating to a structural member flange running parallel to the grating bearing bars.

In another embodiment of the invention, a recess clip is used in conjunction with a second base member and a threaded rod to extend the threaded rod above the grating for the mounting or attachment of various mechanical devices or structural members.

Therefore, the grating fastener of the present invention combines the features of versatility, superior strength, and holding power. The jaw assembly provides superior gripping power to structural member flanges and is not easily dislodged by vibration or lateral forces applied to the grating. In addition, the recess clip provides additional strength and durability against bending.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
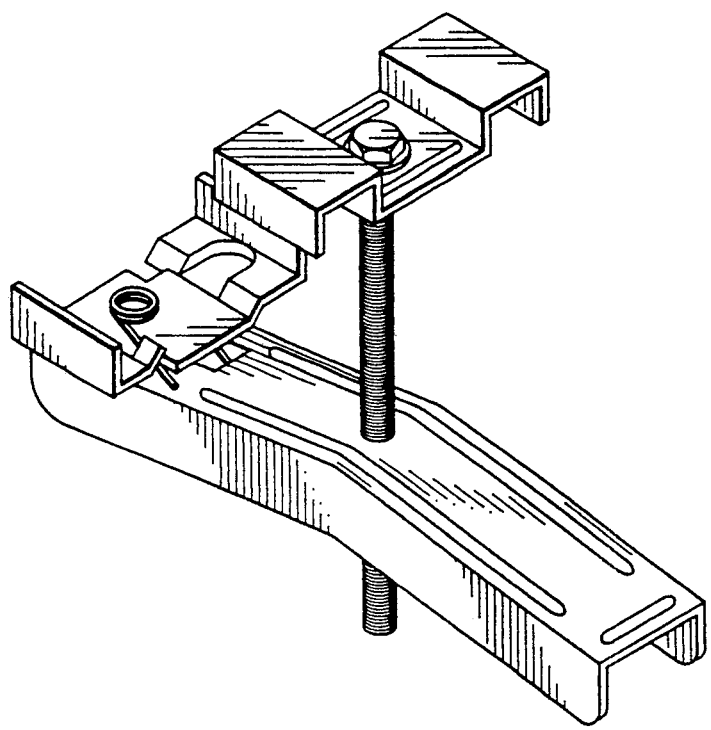
FIG. 1 is a perspective view of a grating fastener used in the prior art.
Figure 2:
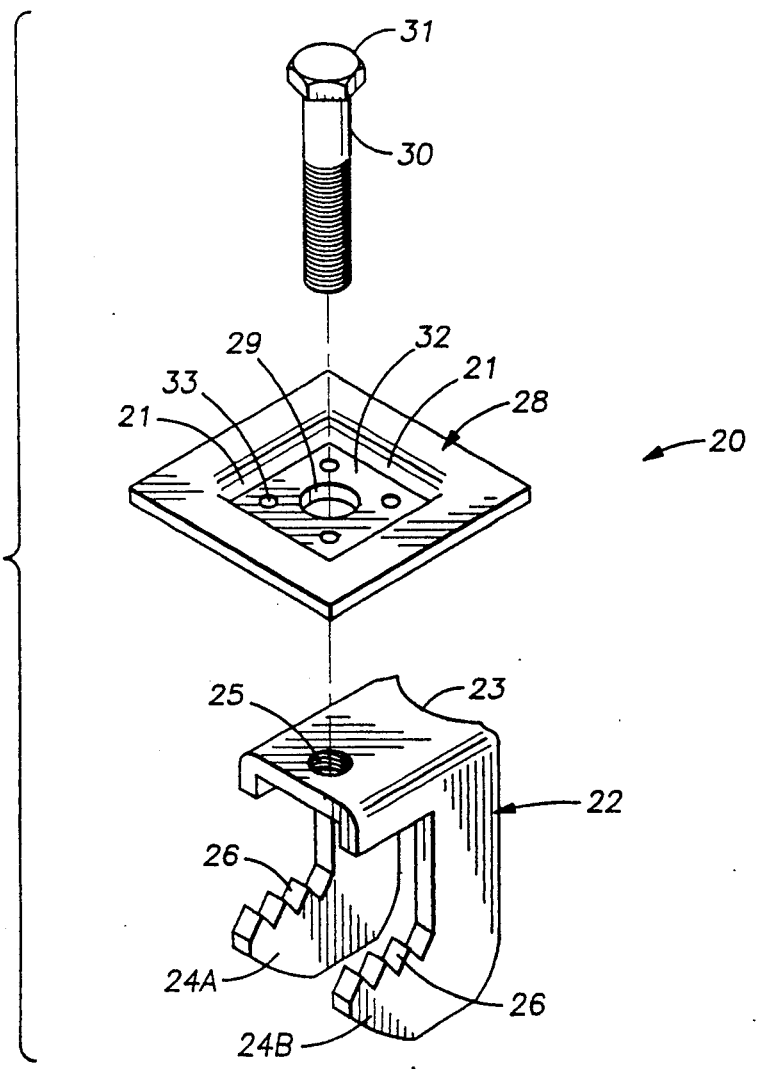
FIG. 2 is an exploded view of the grating fastener according to a first embodiment of the invention.
Figure 4:
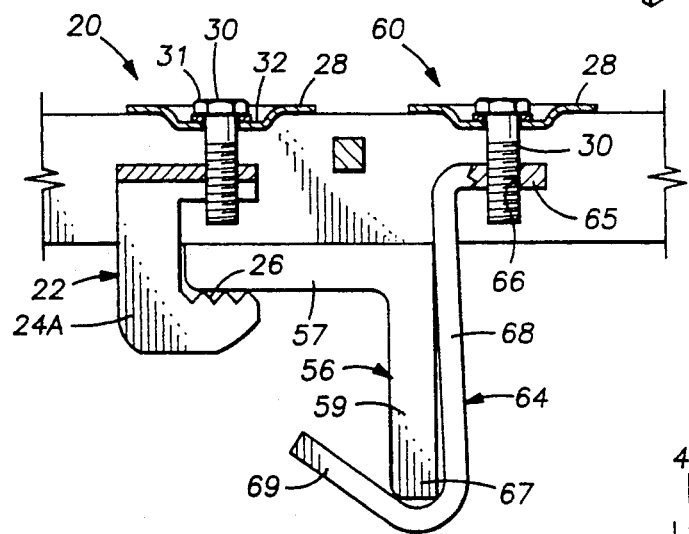
FIG. 4 is a view taken along lines 4—4 of FIG. 3.
Figure 5:
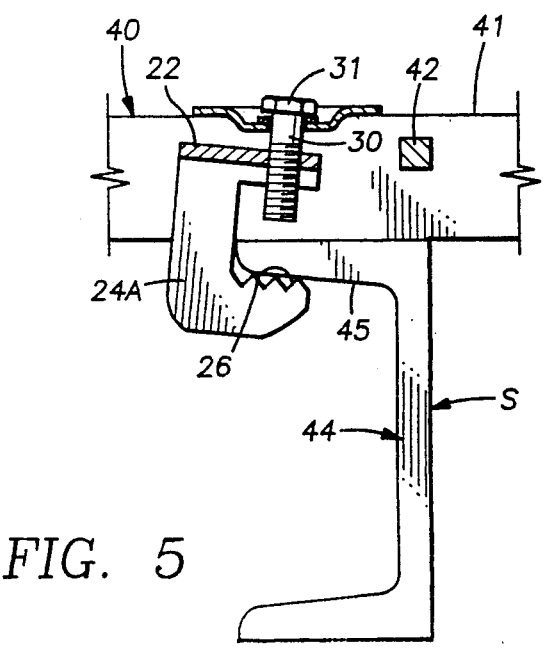
FIG. 5 is a side view showing a grating fastener according to the first embodiment of the invention attaching a section of grating to a structural support member having a tapered flange.

Referring now to FIG. 2, a grating fastener 20 according to a first embodiment of the present invention is shown. The grating fastener 20 according to the first embodiment includes a jaw assembly 22 having a base 23 and two jaws 24A and 24B. Each of the jaws 24A and 24B include teeth 26 on the upper surface of the lower portion of the jaw. When the grating fastener 20 is used to attach grating to a structural member, the teeth 26 are positioned facing the structural underside of the supporting structure as shown in FIGS. 4 and 5. The teeth 26 provide positive gripping action but with a resilience which allows some grating movement without deforming or loosening of the grating fastener 20.

As shown in FIG. 2, the base 23 of the jaw assembly 22 includes a threaded hole 25. The grating fastener 20 includes a top cover or recess clip 28 which includes a centrally located hole 29. The jaw assembly 22 is connected to the recess clip 28 by means of a threaded fastener or bolt 30 which is inserted through the hole 29 in the recess clip 28 and then threadably engaged with the threaded hole 25 in the base 23 of the jaw assembly 22 so that the head 31 of the bolt 30 is situated on top of the recess clip 28. The recess clip 28 is a substantially square plate having a substantially square recessed area 32 defined by a plurality of walls 21 centrally located about the hole 29. The recessed area 32 with the plurality of walls 21 provides the recess clip 28 with additional strength and resistance to bending along the length between the bearing bars of the grating. The square recessed area 32 includes drain holes 33 to prevent condensate or rain from collecting in order to prevent corrosion. The head 31 of the bolt 30 is situated in the recessed area 32 and is flush with or rises only a minimal distance above the upper surface of the recess clip 28, thus providing a relatively flat surface on top of the grating. This complies with Occupational Safety and Health Administration (OSHA) safety regulations and reduces the possibility of a person tripping as a result of the grating fastener 20.

Figure 9:
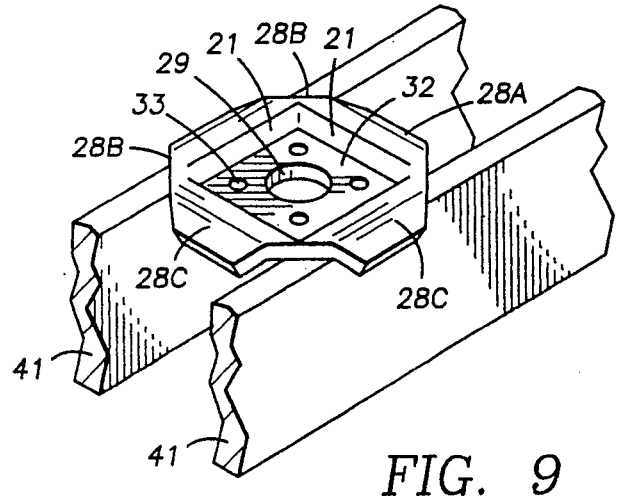
FIG. 9 is a perspective view of a second embodiment of a recess clip of the invention.

FIG. 9 shows a second embodiment of a recess clip 28A which includes the square recessed area 32 defined by a plurality of walls 21, drain holes 33 and the hole 29. The recess clip 28A has angled corners 28B which further reduces the possibility of a person tripping on the grating fasteners. The recess clip 28A also includes legs 28C which extend downwardly from the sides of the recess clip 28A. The downwardly folded legs 28C minimize the tripping hazard and provide additional strength and resistance to bending along the length of the recess clip 28A between the grating bearing bars 41.

Figure 3:
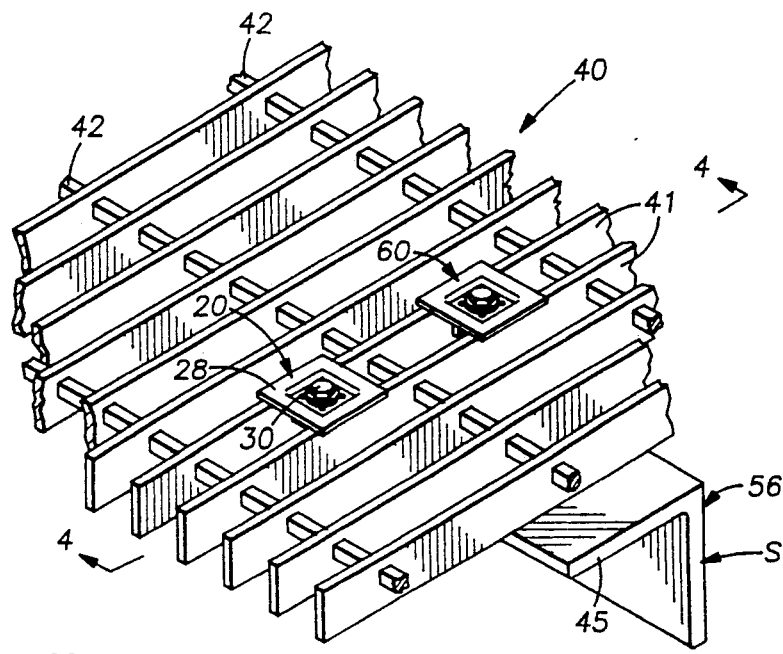
FIG. 3 is a perspective view of a section of grating attached to an angle member with a grating fasteners according to the first and second embodiments of the invention.
Figure 7:
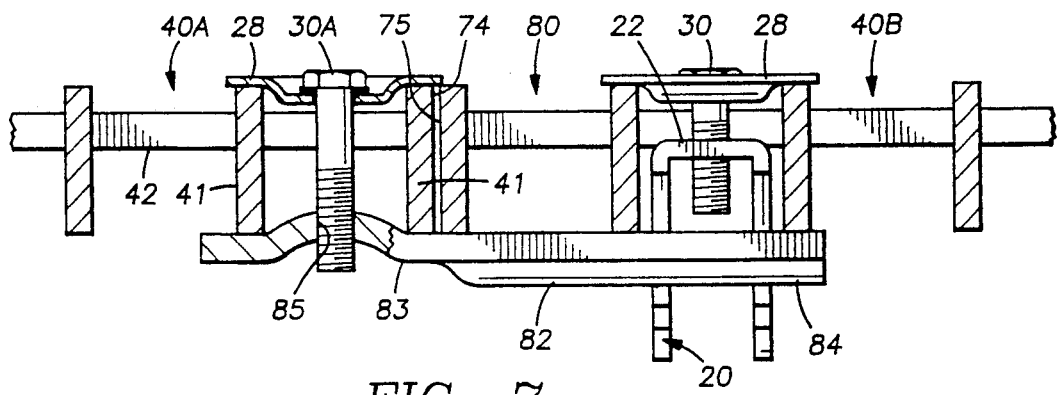
FIG. 7 is a partial cross-sectional view taken along lines 7—7 of FIG. 6, showing the grating connector according to the third embodiment of the invention used to fasten two parallel sections of grating to each other.

Referring now to FIG. 3, a grating fastener 20 according to the first embodiment of the invention is shown attaching a grating 40 to a structural member S, more specifically to a horizontal leg 57 of an angle shaped member 56. The grating 40 is comprised of a number of parallel bearing bars 41 which run the length of a sheet of grating 40 and cross bars 42 which cross or pierce the bearing bars 41 to interconnect the bearing bars 41 together to form the grating 40. As shown in FIG. 3, the recess clip 28 of the grating fastener 20 is situated above and rests on top of two adjacent grating bearing bars 41. The length and width of the recess clip 28 is such that the grating fastener 20 cannot be accidentally dropped through the grating 40 and lost. Typically, the grating bearing bars 4 are $1\frac{3}{8}''$ from the outside of one bearing bar 41 to the outside of the adjacent bearing bar 41. Thus, the recess clip 28 is generally $1\frac{1}{2}''$ square so that the recess clip 28 with the attached jaw assembly 22 cannot drop through the grating 40 during installation. Additionally, as shown in FIGS. 3 and 7, sizing the recess clip 28 in this manner ensures that the recess clip 28 makes good bearing contact with the adjacent bearing bars 41. The recessed area 32 is sized to fit within the area between two adjacent bearing bars 41. The recessed area 32 centers the recess clip 28 between the adjacent bearing bars 41 and also prevents the recess clip 28 from rotating as the bolt 30 is tightened. As previously mentioned, the head 31 of the threaded fastener or bolt 30 is situated in the square recessed area 32 of the recess clip 28, as shown in FIG. 4. Additionally, the recess clip 28 provides a fairly uniform enlarged surface area to absorb the shocks and pounding from large or heavy objects dropped onto the grating 40.

Referring now to FIG. 4, a view taken along line 4—4 of FIG. 3 is shown. In this view, the grating fastener 20 is shown attaching the horizontal leg 57 of the angle member 56 to the grating bearing bars 41. The teeth 26 of the jaws 24A and 24B provide a firm attachment to the leg 57 of the angle member 56. The design of the jaw assembly 22 is such that, as the head 31 of the bolt 30 is tightened, all of the resulting force is applied by the teeth 26 of the jaws 24A and 24B to the leg 57, thus providing a secure attachment. As opposed to some of the prior art fasteners, in certain embodiments of the present invention, 100% of the applied force is provided to fasten the grating to the structural member S, thus providing a stronger and more durable attachment.

The grating fastener 20 according to the first embodiment of the invention is simple and reusable. The grating fastener 20 can be installed from above the grating 40 by one person with minimal training. With the bolt 30 through the recess clip 28 and threadably engaged with the jaw assembly 22, the jaw assembly 22 is lowered through the area between an adjacent pair of bearing bars 41 and the serrated teeth 26 are positioned below the horizontal leg 57 of the structural member S. The recess clip 28 rests on the upper surface of the bearing bars 41. The grating fastener 20 is tightened by merely turning the head 31 of the bolt 30 situated in the recess clip 28, which in turn draws up the jaw assembly 22 until the serrated teeth 26 firmly grip the leg 57. No power tools are required, no holes are made in the supporting structure and little damage, if any, is made to the paint system, if any, on the structural member S.

Referring now to FIG. 5, the grating fastener 20 according to the first embodiment is shown installed to a flange 45 of a structural member S, more specifically a channel member 44, in a manner similar to the installation to the horizontal leg 57 of the angle member 56 in FIG. 4. The flange 45 of the channel member 44 is not of uniform thickness but is tapered on its lower surface. However, as shown in FIG. 4, the grating fastener 20 rotates slightly to permit the serrated teeth 26 to firmly grip and engage the lower tapered surface of the flange 45, thus securing the grating 40 to the channel member 44 in the same manner as stated above.

Referring again to FIG. 4, a grating fastener 60 according to a second embodiment of the invention is shown attaching grating 40 to a vertical leg 59 of an angle member 56. The grating fastener 60 includes the recess clip 28 and the bolt 30 and a generally J-shaped connecting member 64. The J-shaped connecting member 64 includes a horizontal upper end 65 which includes a threaded hole 66 for receiving the bolt 30 and a vertical middle section 68 which ends with a hooked end 69. Therefore, as the bolt 30 is tightened, the hooked end 69 of the J-shaped connecting member 64 is drawn up tightly against the lower end 67 of the vertical leg 59 to secure the grating bearing bars 41 to the angle member 56. The grating fastener 60 may be used separately or in combination with the grating fastener 20 of the first embodiment.

In this manner, the components which form the grating fastener 60 according to the second embodiment are substantially those used in the grating fastener 20 according to the first embodiment. The only extra piece required for the grating fastener 60 according to the second embodiment is the J-shaped connecting member 64.

Figure 6:
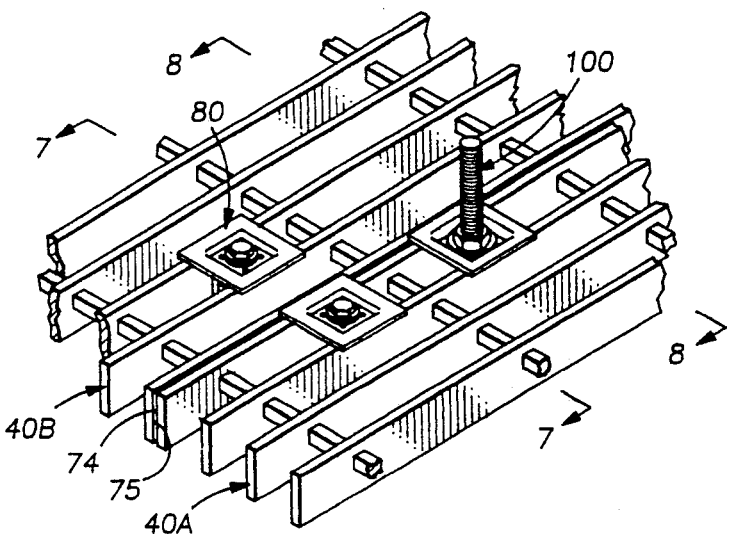
FIG. 6 is a perspective view of two parallel sections of grating fastened to one another with a grating fastener according to a third embodiment of the invention and a grating projection connector according to a fourth embodiment of the invention.

Referring now to FIGS. 6 and 7, a grating connector 80 according to a third embodiment of the invention is shown. The grating connector 80 is used to connect one grating sheet 40A to an adjacent parallel grating sheet 40B. The grating connector 80 of the third embodiment includes the grating fastener 20 according to the first embodiment in combination with an additional recess clip 28, a bolt 30A, and a connector base member 82. One end 83 of the connector base member 82 includes a raised portion which includes a threaded hole 85 for receiving the bolt 30A to firmly attach the raised end 83 of the connector base member 82 beneath adjacent bearing bars 41 of the grating sheet 40A.

To install the grating fastener 80 to fasten adjacent sheets of grating 40 to one another, the bolt 30A is first inserted through the hole 29 of the recess clip 28 before threadably engaging the threaded hole 85 of the connector base member 82. The raised portion at the end 83 of the connector base member 82 is nearest the recess clip 28. The connector base member 82 is lowered through the space between the first and second bearing bars 41 along an edge 74 of the grating sheet 40A and then the second end 84 is rotated until perpendicular to the bearing bars 41 and beneath the grating sheet 40B. The jaw assembly 22 of the assembled grating fastener 20 is lowered between the second and third bearing bars 41 from an edge 75 of the grating sheet 40B and the teeth 26 are positioned below the connector base member 82. The bolts 30A and 30 are tightened down until the grating sheets 40A and 40B are securely fastened to one another between the connector base member 82 and the recess clips 28.

The grating connector 80 is particularly useful to fasten parallel sheets of grating to one another. It is very important that parallel sheets of grating 40 are fastened to each other so that they will react and deflect together when subjected to impacts from heavy objects being placed or dropped on one or the other of the sheets of grating 40. Furthermore, OSHA requirements limit the amount of vertical difference between adjacent sheets of grating 40 to reduce the possibility of a person tripping over such height differences. The grating connector 80 simply and effectively "ties" the adjacent sheets of grating 40 together.

In this manner, many of the standard parts of the grating fastener 20 of the first embodiment are again used to form the grating connector of the third embodiment. The only extra components required for the grating connector 80 according to the third embodiment is the base member 82 and bolt 30A.

Figure 8:
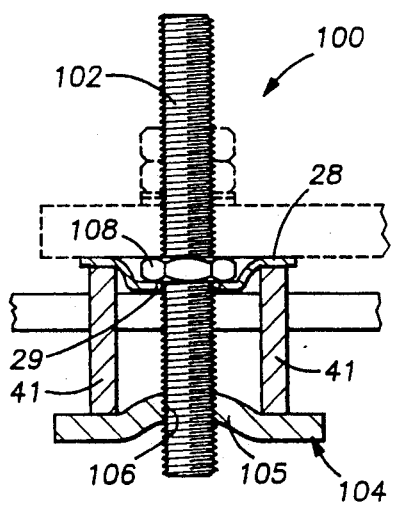
FIG. 8 is a view taken along lines 8—8 of FIG. 6 showing a grating projection connector according to the fourth embodiment of the invention used to project a bolt above the grating for mounting of other structures or devices.

Referring now to FIGS. 6 and 8, a fourth embodiment of the present invention comprising a grating projection connector 100 is shown. The grating projection connector 100 provides a means for firmly mounting various mechanical devices or structures to the upper grating surface. As shown in FIG. 8, the grating projection connector 100 includes a recess clip 28 which includes a centrally located hole 29 through which a threaded rod 102 extends. The grating projection connector 100 further includes a connector base member 104 having a raised intermediate portion 105 similar to the raised end 83 of the base member 82 of FIG. 7. The connector base member 104 includes a threaded hole 106 which mates with threads on the threaded rod 102. The threaded rod 102 passes through the hole 29 in the recess clip 28 and is threadably connected to the connector base member 104. A nut 108 is threadably engaged with the threaded rod 102 above the recess clip 28.

To install the grating projection connector 100, the threaded rod 102 is equipped with the nut 108 on one end of the rod 102, then the recess clip 28 and lastly the connector base member 104 with the raised intermediate portion 105 nearest the recess clip 28 (as shown in FIG. 8) on the other end of the rod 102. The connector base member 104 is lowered between adjacent bearing bars 41 and the recess clip 28 is permitted to rest on the upper surface of the adjacent bearing bars 41. The connector base member 104 is rotated approximately 90 degrees until the ends of the connector base member 104 are perpendicular to the bearing bars 41. The threaded rod 102 is raised vertically until the connector base member 104 bears against the lower surface of the bearing bars 41. The nut 108 is rotated until it tightens against the recess clip 28 and firmly secures the connector base member against the lower surface of the bearing bars 41. The raised intermediate portion 105 centers and aligns the connector base member 104 between the adjacent bearing bars 41 and also prevents the connector base member 104 from rotating as the grating projection connector 100 is being installed and tightened. The threaded rod 102 extends above the grating 40 to provide a means for connecting various structures or devices, shown in FIG. 8 by dotted lines. Several grating projection connectors 100 may be used together to mount a tubular pipe support having a pipe flange at its lower end wherein the flange can be positioned over the threaded rods 102 and bolted down to the grating 40.

Therefore, a grating fastener which in certain embodiments provides versatility of use in connecting grating to structural support members, parallel grating sheets to each other, or which can be used to mount structural or mechanical devices on the upper grating surface, is described. The unique design of the jaw assembly 22 and teeth 26 provides extra strength and holding power for the grating fastener. The top cover 28 or recess clip is wider and longer than the distance between adjacent bearing bars 41 so that the assembled grating fastener cannot accidentally fall through the grating 40 during installation. The square recessed area 32 provided in the recess clip 28 provides additional strength against bending during installation and while in use and further provides a strong, durable surface. The grating fastener can be installed from above the grating by one person with no power tools required or without any holes required to be formed into the structural support members. The grating fastener is easily retrievable and thus can be reused as many times as desired.

The description given herein is intended to illustrate the preferred embodiments of the present invention. It is possible for one skilled in the art to make various changes to the details of the apparatus without departing from the spirit of this invention. Therefore, it is intended that all such variations be included within the scope of the present invention as claimed.

I claim:

1. A grating fastener for fastening a grating sheet to another member in contact with the grating sheet, the grating sheet having a plurality of parallel grating bars wherein each grating bar has an upper and lower surface and a first and second side, the grating fastener comprising:
    a recess clip for mounting on the upper surface of adjacent grating bars and having a hole disposed therein, said recess clip having a length and a width greater than the distance between adjacent grating bars such that either the length or the width of said recess clip spans across the adjacent grating bars;
    an assembly for engaging the member or lower surface of adjacent grating bars; and
    a fastening means for passing through said hole in said recess clip and for engaging said assembly.

2. A composite grating fastener for fastening a first grating sheet to an adjacent second grating sheet wherein each grating sheet has a plurality of parallel grating bars, the composite grating fastener comprising:
    a first grating fastener attaching to the first grating sheet;
    a second grating fastener attaching to the second grating sheet;
    a connecting means for connecting the first grating sheet to the second grating sheet;
    wherein said first and second grating fasteners engage said connecting means.

3. The composite grating fastener of claim 2, wherein said first grating fastener comprises:
    a first recess clip which mounts on adjacent grating bars of the first grating sheet and having a hole disposed therein; and
    a first fastening means passing through said hole in said first recess clip and for engaging said connecting means.

4. The composite grating fastener of claim 2, wherein said second grating fastener comprises:
    an assembly for engaging said connecting means;
    a second recess clip for mounting on adjacent grating bars of the second grating sheet and having a hole disposed therein; and
    a second fastening means passing through said hole in said second recess clip and for engaging said assembly.

5. The composite grating fastener of claim 4, wherein said assembly includes:
    a base having a hole for receiving said second fastening means.

6. The composite grating fastener of claim 5, wherein said base includes:
    one or more jaws for engaging said connecting means.

7. The composite grating fastener of claim 6, wherein each said jaw includes teeth for engaging and gripping said connecting means.

8. The composite grating fastener of claim 2, wherein said connecting means comprises:
    a connector member having a first end that is situated to contact adjacent grating bars of the first grating sheet and a second end that is situated to contact adjacent grating bars of the second grating sheet;
    wherein said first grating fastener engages said first end of said connector member and said second grating fastener engages said second end of said connector member.

9. The composite grating fastener of claim 8, wherein said first end of said base member has a raised portion which extends upwardly into the area between adjacent grating bars of the first grating sheet.

10. A composite grating fastener for fastening a first grating sheet to an adjacent second grating sheet wherein each grating sheet has a plurality of parallel grating bars, the composite grating fastener comprising:
    a connecting means for connecting the first grating sheet to the second grating sheet, said connecting means comprises:
        a connector member having a first end that is situated to contact adjacent grating bars of the first grating sheet and a second end that is situated to contact adjacent grating bars of the second grating sheet;
    a first grating fastener attaching to the first grating sheet, said first grating fastener comprising:
        a first recess clip which mounts on adjacent grating bars of the first grating sheet and having a hole disposed therein; and
        a first fastening means passing through said hole in said first recess clip and for engaging said connector member, wherein said first fastening means may be tightened to securely fasten the first grating sheet to said first end of said connector member;
    a second grating fastener attaching to the second grating sheet, said second grating fastener comprises:
        an assembly for engaging said connector member;
        a second recess clip for mounting on adjacent grating bars of the second grating sheet and having a hole disposed therein; and
        a second fastening means passing through said hole in said second recess clip and for engaging said assembly.

11. The composite grating fastener of claim 10, wherein said first end of said connector member has a raised portion which extends upwardly into the area between adjacent grating bars of the first grating sheet.

12. The composite grating fastener of claim 10, wherein each said jaw includes teeth for engaging said second end of said connector member.

13. The composite grating fastener of claim 10, wherein said first and second recess clips each include a recessed area disposed therein.

14. A grating projection connector for mounting various devices to a grating sheet having a plurality of parallel grating bars with each grating bar having an upper and lower surface, the grating projection connector comprising:

a recess clip having a length greater than the distance between adjacent grating bars and which mounts on the upper surface of the adjacent grating bars, said recess clip has a hole disposed therein;

a base member having a length greater than the distance between adjacent grating bars which bear against the lower surface of the adjacent grating bars;

a threaded projection member which passes through said hole in said recess clip and engages said base member; and a means for securing said base member and said recess clip to the grating sheet, wherein said securing means includes a nut which threadably engages said projection member for securing said recess clip and said base member to the upper and lower surfaces of the grating bars respectively.

15. A method for mechanically fastening a first grating sheet to an adjacent second grating sheet with a composite grating fastener, wherein each grating sheet has a plurality of parallel-spaced grating bars with each grating bar having an upper and lower surface, and the composite grating fastener includes a first grating fastener, a second grating fastener, and a connector member, the method comprising the steps of:

connecting the first grating fastener to the connector member;

lowering the connector member between the parallel-spaced grating bars of the first grating sheet to a position below the lower surface of the grating bars;

lowering the second grating fastener between the parallel-spaced grating bars of the second grating sheet;

securely attaching the second grating fastener to the connector member; and securely attaching the first grating fastener to the connector member.

16. The method of claim 15, further comprising the step of:

rotating the connector member approximately ninety degrees such that the base member is substantially perpendicular to the grating bars.

17. A grating fastener for fastening a grating sheet to another member in contact with the grating sheet, the grating sheet having a plurality of parallel grating bars wherein each grating bar has an upper and lower surface and a first and second side, the member includes a first and second leg wherein the first leg is substantially perpendicular to the second leg and substantially perpendicular to the first and second sides of the grating bars, and the first leg is positioned to contact the lower surface of the grating bars, the grating fastener comprising:

a recess clip for mounting on the upper surface of adjacent grating bars and having a hole disposed therein, said recess clip having a length and width greater than the distance between adjacent grating bars such that either the length or the width of said recess clip spans across the adjacent grating bars;

an assembly for engaging the second leg of the member, said assembly comprising a generally J-shaped connecting member for engaging the second leg of the member, said generally J-shaped connecting member having a hole therein; and a fastening means for passing through said hole in said recess clip and for engaging said assembly via said hole in said J-shaped connecting member.

* * * * *